United States Patent Office 2,974,173
Patented Mar. 7, 1961

2,974,173
ACETALDEHYDE MANUFACTURE

Robert B. Long, Wanamassa, Carl E. Heath, Jr., Nixon, and Victor Kevorkian, Westfield, N.J., assignors to Esso Research and Engineering Company, a corporation of Delaware No Drawing. Filed Feb. 24, 1959, Ser. No. 794,821

8 Claims. (Cl. 260—604)

This invention relates to a new improved method of preparing acetaldehyde directly from ethane by a novel noncatalytic vapor-phase oxidation technique. More specifically this invention relates to the noncatalytic oxidation of gaseous ethane with an oxygen-containing gas and modifying amounts of ozone at certain temperatures and pressures to effect the production of acetaldehyde in a highly selective reaction. This application is a continuation-in-part of S.N. 751,855 filed July 30, 1958 and now abandoned.

Acetaldehyde is, of course, a well-known commercial chemical which finds utility in various fields. In particular acetaldehyde is employed as an intermediate in the manufacture of other chemicals, in plastics, in synthetic fibers and as a solvent. The prior art processes for the production of acetaldehyde are many in number and this chemical is made by one of the following three processes. The first technique comprises reacting high purity acetylene with water and a mercurous sulfate catalyst in an acidic solution. During the reaction the catalyst is converted to a metallic mercury sludge. The feed, pure acetylene, is relatively expensive and the catalyst must be chemically regenerated. A second process for the production of acetaldehyde involves the dehydrogenation or oxidation of ethanol. This technique is straightforward but is also considered to be relatively uneconomical in view of the cost of the ethanol. The ethanol, for example, must be made from ethane or ethylene by sulfuric acid extraction or similar techniques. The third commercial technique involves the oxidation of butane at elevated pressures and temperatures to effect a reaction product mixture comprising some acetaldehyde, some formaldehyde, and small amounts of acetone, organic acids, methanol, propanol and butanol. Butane, while not quite as expensive as ethanol, is more costly than the lighter paraffins such as ethane and in any event the reaction product mixture resulting from butane oxidation contains a relatively low percentage of the desired acetaldehyde. It appears obvious that the prior art processes for the production of acetaldehyde leave much to be desired.

It has now been discovered that ethane, a low cost gas which is found in treated or untreated refinery streams, may be reacted in vapor phase with an oxygen-containing gas and further in the presence of critical modifying amounts of ozone at a temperature of 200–700° F. to effect the production of oxy compounds with high selectivity to the desired acetaldehyde. This result is unusual since ethane is known to be difficult to oxidize, and usually when oxidation does occur, substantial amounts of $H_2O$ and $CO_2$ are formed. The conditions employed for the present invention may vary somewhat depending on the particular apparatus utilized. For example, a very simple type of reactor would comprise an open tube which is maintained, by external heat exchange, at the desired temperature level. In addition to external heat exchange, there may be employed inert gas diluents to aid in temperature control. Gases such as $N_2$, $CO_2$ and the like are suitable; however, the use of inert gases adds to the cost of product recovery and separation. The reactant ethane, the oxygen and ozone are then simply passed through the tube at a predetermined space velocity. The gaseous reaction product mixture is then condensed to form a liquid mixture of oxygenated products which is separated into its component parts. There are, however, more complex oxidation reactors which are amenable to this process. For example, the oxidation reactor disclosed in United States Patent 2,809,891 to Kittleson et al., which relies on inert fluidized solids to withdraw the exothermic heat of reaction, may be employed. This reactor design presents an efficient method for the vapor-phase noncatalytic oxidation of ethane for the present purposes.

Another reactor design which has recently been developed involves the "raining solids" technique wherein the finely divided solids are continuously dispersed in a relatively homogeneous fashion through the reactor in an amount sufficient to maintain the desired temperature but insufficient to quench the reaction. The gas flow may be up for countercurrent operation or down for a cocurrent flow. In this last-described design, the inert solids are allowed to rain down through the reaction mixture under essentially free-fall conditions. Since ethane oxidation is highly exothermic, an efficient technique for temperature control is essential to the process. As will be pointed out subsequently, temperatures in excess of those expressed herein are deleterious from the standpoint of the selectivity to the desired products. Temperatures in excess of those contemplated herein will result in the production of less desirable decomposition and oxidation products of ethane such as methane, carbon dioxide, water, carbon monoxide, hydrogen, ethylene and small amounts of $C_3$ to $C_6$ saturates.

It can be seen therefore that the specific feed rates, contact time, oxygen partial pressure and other conditions may vary according to the efficiency of the oxidation reactor employed. Generally the reaction temperature must be maintained between 200–700° F., preferably 400 to 600° F. At temperatures above about 700° F. the acetaldehyde product is less than about 5 wt. percent.

Another factor governing the conditions employed is the degree of conversion desired. With simple oxidation reactors where the temperature is difficult to control, it is advisable to maintain the conversion level rather low in order to avoid runaway temperatures. On the other hand, where more advanced oxidation reactors are used wherein good control of temperatures is possible, higher conversions may be obtained. The total oxygen to ethane mole ratio is preferably maintained between 0.15 to 2.0/1. It will be shown subsequently that superior results are obtainable by holding this ratio to below about 0.5/1. The oxygen is added either through one or a plurality of injection points, the latter being preferred as a technique for controlling temperature and avoiding hot spots within the reactor. The total pressure may vary between atmospheric and 1000 p.s.i.g. or higher. Ozone must be employed to effect the desired conversion of ethane to acetaldehyde. Amounts in the ratio of 0.05 to 8 volume percent based on oxygen may be employed. Superior results are obtained when the ozone concentration is held below about 5 volume percent and the oxygen partial pressure below about 5 atmospheres. Amounts below the broad range do not appear to modify the reaction and require temperatures above that which are conducive to the selective production of acetaldehyde. On the other hand, concentrations above about 8 volume percent on oxygen effect ozonolysis of the ethane and seriously detract from the selectivities and conversions to the desired oxy products. Even small excesses of ozone cause direct oxidation of the ethane to formaldehyde. The optimum contact time for this vapor phase reaction will also vary according to temperature, pressure and the type of oxidant employed. For the simple open tube type reactor wherein the conversion is maintained at a low level, a contact time between 0.5 to 4 seconds is preferred. The conversion level is relatively unimportant since the off gases may be recycled to the reactor after condensation of the oxy products. CO and $CO_2$ may be removed from the off gases by absorption in diethanolamine solutions. Unreacted oxygen and ethane may be recycled to the reactor where ozone is added. However, it is again emphasized that with apparatus whereby exact and efficient control of the reaction temperature may be had, the conversion levels may run as high as 75%.

To demonstrate the value of the present invention, reference is had to the following three examples which compare ethane oxidation under the preferred conditions of this invention, ethane oxidation with modified oxygen partial pressure, and ethane oxidation in the absence of ozone modifier.

*Example 1*

Ethane was preheated to 150° F. and passed to the reactor with oxygen at an $O_2$/ethane mole ratio of 0.2 under atmospheric conditions. Present with the oxygen there was employed 2 volume percent of ozone based on oxygen. The reactant mixture was passed through the heated tube reactor with temperatures being maintained at about 550° F. with a contact time at this temperature of about 2 seconds. The reaction product effluent was passed from the reactor to a condenser wherein liquid product was formed. Under the aforenoted conditions there was obtained a conversion of about 15%. Conversion was deliberately maintained at a relatively low level in order to avoid runaway temperature which would have been inevitable using this type of reactor. The reaction product mixture contained 80 weight percent of oxy compounds which in turn analyzed as follows: 60% acetaldehyde, 35% formaldehyde and ethylene oxide, and as a mixture 5% of formic acid, acetic acid, methanol and ethanol.

*Example 2*

The procedure of Example 1 was repeated employing an oxygen to ethane mole ratio of 0.31 and a temperature of 450° F. The selectivity to oxy compounds was 34 wt. percent.

*Example 3*

Example 1 was repeated except with no ozone modifier and employing a raining solids reaction such as described above. The temperature within the reactor had to be raised to 1130° F. before any measurable oxidation occurred. The reaction products from this experiment comprised methane, carbon dioxide, $H_2O$, carbon monoxide, hydrogen, ethylene and smaller amounts of $C_3$–$C_6$ saturates.

The following example demonstrates the effect of high ozone concentrations and high oxygen to hydrocarbon ratios just outside of the preferred range but within the contemplated broad range. While in the following example acetaldehyde was produced in substantial quantities, the selectivity was considerably lower than that obtained when operating within the preferred ranges. It is evident that an oxidation process outside of the broad range would result in no appreciable production of the desired acetaldehyde.

*Example 4*

In this example an oxygen to ethane ratio of 0.5 at atmospheric conditions was employed. There was incorporated in the oxygen, ozone in an amount of approximately 5 volume percent based on the oxygen. The reactant mixture was passed through a heated tube maintained at approximately 500° F. with a residence time of 3 seconds. The reaction product effluent from the open tube reactor was condensed to liquid product. The oxy compounds were analyzed as follows:

60 weight percent formaldehyde
40 weight percent acetaldehyde.

In the above case the conversion was maintained at a relatively low level, e.g., about 10%, for ease of temperature control and to avoid runaway conditions.

The only substantial variables between Example 4, which showed a relatively low selectivity to acetaldehyde, and Example 1, showing a high selectivity to acetaldehyde, were ozone concentration and oxygen to hydrocarbon ratio. Thus, the need for maintaining the oxygen partial pressure and ozone concentration within the preferred limits is apparent, although it is possible to operate within the broader ranges noted in the above specification.

It is to be understood that the ethane reactant may be relatively pure or in admixture with other components such as ethylene and small amounts of $C_1$ and $C_3$ hydrocarbons.

What is claimed is:

1. A process for producing acetaldehyde which comprises reacting ethane in a vapor-phase noncatalytic system with from 0.15 to 2.0 moles of oxygen per mole of ethane and further in the presence of 0.05 to 8 volume percent ozone based on oxygen at a temperature between about 200–700° F.

2. A process in accordance with claim 1 wherein the oxygen to ethane role ratio is maintained below about 0.5.

3. A method in accordance with claim 1 wherein the concentration of ozone is maintained below about 5 volume percent based on oxygen.

4. A process in accordance with claim 1 wherein the oxygen to ethane mole ratio is maintained below about 0.5 and the concentratiton of ozone is maintained below about 5 volume percent based on oxygen.

5. A process for selectively producing acetaldehyde which comprises reacting ethane in a vapor-phase noncatalytic system with from 0.15 to 2.0 moles of oxygen per mole of ethane and further in the presence of 0.05 to 8 volume percent ozone based on oxygen at a temperature between about 200–700° F. and at a pressure from atmospheric to about 1000 p.s.i.g.

6. A process in accordance with claim 5 wherein the oxygen to ethane mole ratio is below about 0.5.

7. A method in accordance with claim 5 wherein the concentration of ozone is maintained below about 5 volume percent based on oxygen.

8. A process in accordance with claim 5 wherein the oxygen to ethane mole ratio is maintained below about 0.5, the concentration of ozone is maintained below about 5 volume percent based on oxygen, and the reaction temperature is maintained between about 400 to 600° F.

References Cited in the file of this patent

UNITED STATES PATENTS

| | | |
|---|---|---|
| 1,923,610 | Bludworth | Aug. 22, 1933 |
| 2,700,677 | Bowen et al. | Jan. 25, 1955 |
| 2,775,601 | Gardner et al. | Dec. 25, 1956 |